W. B. FLOYD.
CAR WHEEL.
APPLICATION FILED JAN. 24, 1913. RENEWED JULY 22, 1915.
1,252,895.
Patented Jan. 8, 1918.
2 SHEETS—SHEET 1.
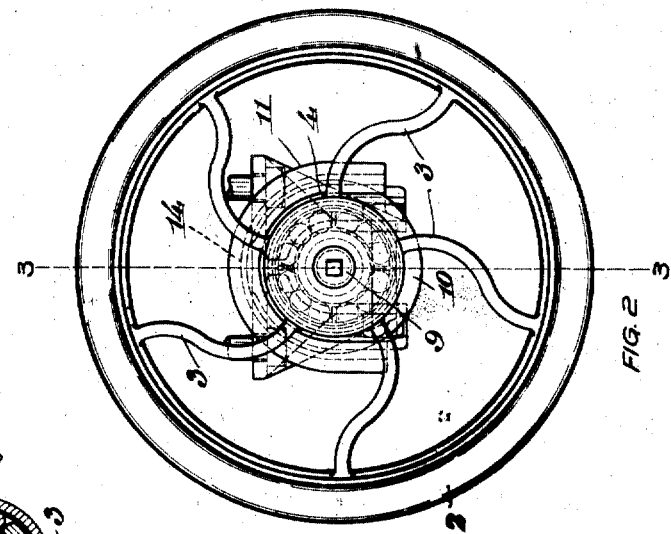
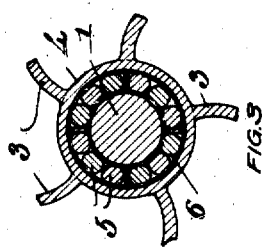
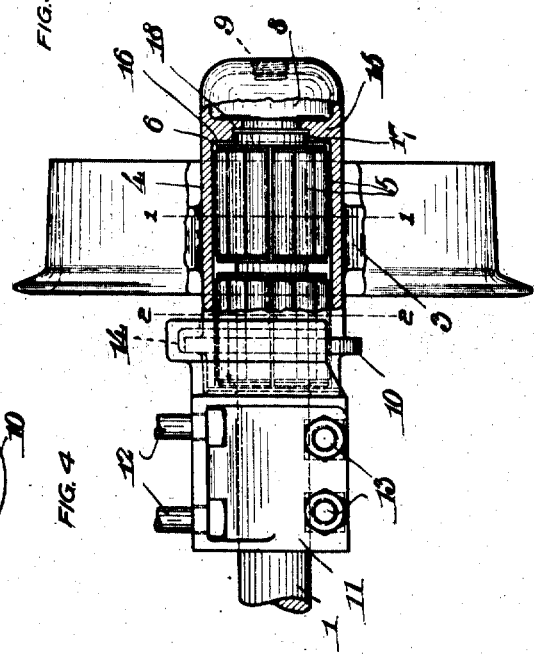
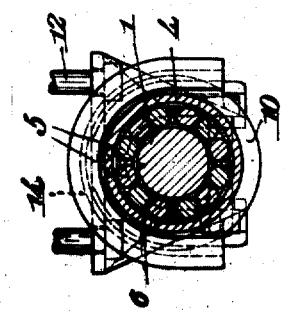
WITNESSES:
INVENTOR.
BY Walter B. Floyd
ATTORNEY.

W. B. FLOYD.
CAR WHEEL.
APPLICATION FILED JAN. 24, 1913. RENEWED JULY 22, 1915.

1,252,895.

Patented Jan. 8, 1918.
2 SHEETS—SHEET 2.

Witnesses
N. H. Lybrand
Stanley D. Cook

Inventor
Walter B. Floyd
By H. H. Bliss
Attorney

UNITED STATES PATENT OFFICE.

WALTER B. FLOYD, OF COLUMBUS, OHIO, ASSIGNOR TO THE BONNEY-FLOYD COMPANY, OF COLUMBUS, OHIO, A CORPORATION OF OHIO.

CAR-WHEEL.

1,252,895.  Specification of Letters Patent.  Patented Jan. 8, 1918.

Application filed January 24, 1913, Serial No. 743,996. Renewed July 22, 1915. Serial No. 41,414.

*To all whom it may concern:*

Be it known that I, WALTER B. FLOYD, a citizen of the United States, residing at Columbus, in the county of Franklin and State of Ohio, have invented certain new and useful Improvements in Car-Wheels, of which the following is a specification, reference being had therein to the accompanying drawing.

This invention relates to improvements in car wheels and in particular to that general class known as mine car wheels in which the wheel itself is rotatably mounted upon the end of an axle secured beneath a car. One of the objects is to provide a cast steel wheel having the inner end of the hub so formed as to provide a housing for a roller bearing cage and likewise take care of the end thrust of the axle. Among other objects are improvements in the lubricating system and in the car bearing which is used for holding the wheel in its proper axial position.

Referring to the drawings,—

Figure 1 is a fragmentary side elevation of my improved car wheel showing it mounted upon the end of an axle, parts of the hub being broken away to expose the bearing and grease reservoir.

Fig. 2 is an end elevation.

Fig. 3 is a partial vertical transverse section on the line 1—1 of Fig. 1.

Fig. 4 is a transverse vertical sectional view on the line 2—2 of Fig. 1.

In the drawings,—

Figure 6:
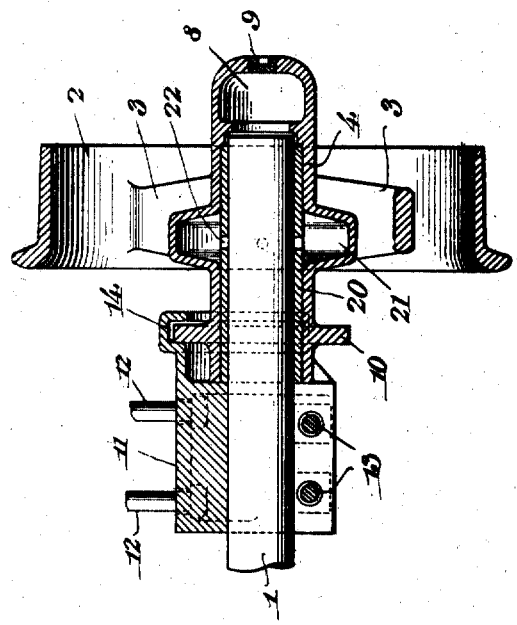
Fig. 6 is a longitudinal vertical sectional view through a car wheel embodying my invention in modified form.
Figure 5:
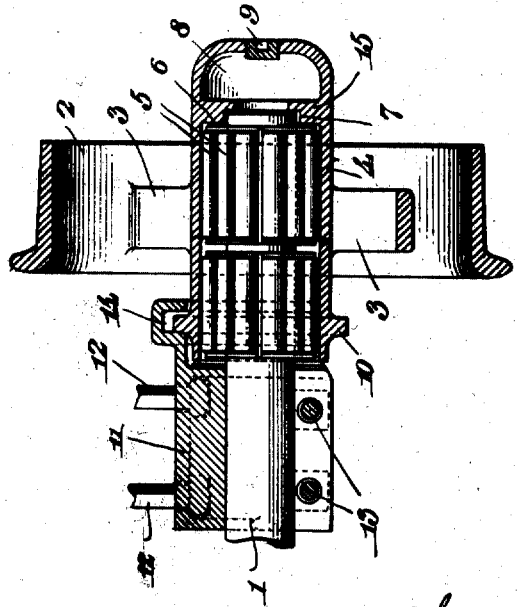
Fig. 5 is a longitudinal vertical sectional view on the line 3—3 of Fig. 2.

The numeral 1 indicates a round shaft or axle transversely disposed beneath a car body and adapted to carry on each of its ends a track wheel. The shaft is of the same diameter throughout its length and its ends are squared off at right angles. A flanged wheel 2 having spokes 3 and a hub 4 is supported upon an end of the shaft 1 by means, in that form of my invention illustrated in Figs. 1 to 5, of a double set of roller bearings 5—5. The roller bearings are contained within cages 6 and are so disposed that the axial center of each set of rollers is approximately equi-distant from the tread of the wheel or the point at which the flange 7 contacts with the rail. The exterior portion of the hub is of somewhat tubular shape extending outward beyond the space within which the rollers are contained and is rounded off at its other end to form a grease reservoir 8. Access to this reservoir is had by removing a screw plug 9 threaded into the end of the hub. A short distance from the inner end the hub is flanged out to provide a ring 10 to retain the hub in its proper axial position. A car bearing 11 is secured by bolts 12 to the bottom of the car and is open through its bottom section for the reception of the axle. Two bolts 13—13 extend through the lower portions of the car bearing directly below the axle so as to prevent any accidental displacement of the bearing upon the axle. The outer end of the car bearing is extended over the flange 10 and grooved out at 14 to provide a hood or chamber within which the flange 10 rotates. The bottom of the hood is open to allow the shaft and wheel to be dropped down and out of the bearing.

An internal thrust or jam ring 15 is cast integral with the wheel hub near its outer end. This ring has an inner shoulder 16 so positioned as to take end thrust of the roller bearing cage 6. At the inner edge 17 of the shoulder 16 the flange is of such a diameter as to make a comparatively close fit with the axle 1. Beyond the end of the axle the ring extends still farther toward the hub axis providing an outer shoulder 18 against which the end of the axle is free to contact. This shoulder extends a slight distance toward the axis of the hub, leaving an axial opening communicating with the grease reservoir 8.

It has been common practice to provide collars upon the axles for the purpose of axially positioning the car wheel. When these were employed, axles were usually made of square stock and the ends or bearing seats turning around as far back as the collars. Square stock of this kind is more expensive than cold rolled round stock, such as round shafting, to which must be added the cost of lathing the ends for the bearing seats and shrinking on or otherwise affixing the axle collars at each end. Applicant has eliminated the necessity of using the more expensive square stock as well as the expensive process of machining, by doing away with the collars entirely and providing on the wheel itself means for preventing the side shift of a round axle. The thrust ring or shoulder against which the end of the axle abuts is cast integral with the hub and forms a double shoulder the outer shoulder serving as a stop for the axle, whereas the inner (axially arranged) shoulder serves to hold in place the roller bearing cage. Between the two shoulders the ring is bored out to receive the end of the shaft and is of such a diameter as to make a comparatively close fit. This is for the purpose of restricting the passage of grease from the reservoir in the outer end of the hub to the roller bearings.

It will be seen that the inner surface of the chamber in which are mounted the roller bearings 5 is a plain cylindrical surface from the shoulder 16 to the inner end of the hub. It has heretofore been customary to interpose between a hollow hub having some of the characteristics of the hub herein illustrated and described and the axle on which the wheel is mounted, a single set of roller bearings that are comparatively long, they being in practice in the neighborhood of five inches each in length. It has been found that the rollers of bearings of this kind sometimes become twisted or bent, owing to their length, which, as will be understood, immediately destroys or seriously impairs their usefulness as friction reducing bearings. It is also found that such long roller bearings nearly always wear unevenly and the rollers gradually assume a shape approximating that of a cigar, that is to say, one end portion,—the inner—, of each roller wears away more rapidly than the other portions thereof; the result of which is that as soon as this occurs to any appreciable extent the wheel begins to wabble or rock, and this tendency if allowed to continue increases in degree until the wheel is destroyed or injured. The reason for this uneven wearing is that the greater part of the load is borne by those portions of the roller bearings that are vertically above the tread line of the wheel and from this line inward. Hence these parts are subject to the greatest wear. This tendency to uneven wear of the roller bearings is especially apparent in the wheels of cars used in mines where frequent and sharp curves are encountered, the greatest strains and wear upon the bearings being developed in the passing of curves.

I have discovered that by making the bearings in two sets, as shown in the drawings, the rollers of each set being comparatively short, the unequal wear in the bearings is largely reduced and is so distributed as to be largely negligible in its effect upon the running wheel, for even if the inner ends of each set of rollers should wear faster than the outer ends of such rollers, the wheel would nevertheless have two sets of bearings, each but relatively little worn and separated some considerable distance from each other, in engagement with the axle, with the result that the wheel is supported so that it will not rock. If either set of bearings becomes so worn or defective as to require its being replaced this can be easily done, since the wheel as a whole is readily removable from the axle and both sets of rollers are mounted in a single bearing chamber of the wheel hub, the walls of which chamber, as has been stated, are of a plain cylindrical shape permitting the ready insertion and removal of both sets of bearings through the open inner end of the hub.

Fig. 6 illustrates a modified form of car wheel in which the cast steel wheel is carried upon a bronze bushing 20 between the axle 1 and the hub 4. A flange 10 is provided upon this hub as in the previously described one for engagement with the car bearing 11. In this type of hub a lubricant reservoir 21 is provided in the form of an annular chamber extending around the hub at approximately its axial center. Openings 22 are provided in the bushing for the passage of lubricant from the chamber 21 to the bearing surface.

As in the previous type of hub, the thrust ring 15 is cast integral with the end of the hub in such a way as to provide a shoulder 18 to serve as an abutment for the end of the axle, and an inner shoulder 16 for retaining the bushing in place and constitutes a partition separating the bearing chamber from the grease chamber of the hub, the partition being axially perforated to afford communcation between such chambers. The end of the hub is provided with a grease reservoir 8 through which the lubricant is free to pass inward to the bushing.

By having the bearings 11 each formed with an upper approximately semi-cylindrical interior bearing surface and with an open passage through the bottom, the axle and its wheels can be separated readily, at any time from the car. And as the lower part of the metal of each box extends downward on each side of the axle, as shown in side view in Fig. 1 and in end view in Figs. 2 and 4, it permits the free movement of the axle vertically and on lines transverse to its axis out from the bearing box, or back into it. The chamber at 14 for the retaining flange 10 is correspondingly curved at its upper end, but has straight vertical entrance passages extending downward from the horizontal plane of the axis of the axle, as shown in Figs. 2 and 4, so that the retaining flange can readily enter or escape from the chamber 14 when the car body is lowered or lifted.

What I claim is:—

1. The combination with a wheel hub adapted to rotate upon a shaft, of an annular bearing interposed between the hub and the shaft, and a ring extending within the outer end of the hub and providing an abutment for both the outer end of the bearing and end of the shaft.

2. The combination with a wheel hub adapted to rotate upon a shaft, of an annular bearing interposed between the shaft and hub, the end of the hub being closed and a ring extending inward within the hub and dividing off a lubricant chamber between its walls and the end wall of the hub, and likewise providing an abutment for the end of the shaft.

3. The combination with a wheel hub adapted to rotate upon a shaft, of an annular bearing interposed between the shaft and the hub, the outer end of the hub being inclosed and providing a lubricant chamber, an annular ring extending inward within the hub and closely fitting the periphery of the end of the shaft outside of the bearing, and a lip extending inward from the said ring to provide an abutment for the end of the shaft.

4. In a wheel mounting for mine cars, the combination of the car body, the bearing box, the wheel having cast integrally together a tread a flange which determines the tread line on the track and a hub elongated axially inward and outward and formed with a radially expanded chamber elongated to extend across the plane of the tread line and across the longitudinal vertical planes of the box metal, the axle mounted rotatively loosely in the bearing box and movable axially therethrough, two independent sets of anti-friction rollers both positioned in and longitudinally removable from the end of said chamber, all the rollers of each set being in the same transverse planes, and those of one set being outside and those of the other set being inside of the vertical plane of the tread line of the wheel, and means for separably holding the wheel properly laterally relatively to the box.

5. In a wheel mounting for mine cars, the combination of the body, the box secured thereto and provided with a laterally acting wheel retainer, the wheel having cast integrally together a tread a flange arranged to determine the normal tread line of the wheel and a hub, said hub being elongated axially inward and outward and formed with an axially acting wheel retainer engaging the retainer aforesaid and also with two chambers one being a lubricant chamber and the other being an axle journal chamber with an axle abutment rigid with the hub, the axle mounted rotatively in and longitudinally movable through the box, and two sets of independent anti-friction rollers in the said journal chamber around the axle in the said chamber both removable through the same end of the hub, the inner ends of all of the rollers being held closely adjacent to the vertical longitudinal plane of the tread line of the wheel.

6. The combination of an axle, a wheel supported thereon having a hollow hub in which is formed a bearing chamber open at its inner end, and a grease chamber at its outer end, these chambers being separated by a partition, perforated axially whereby they communicate, this partition serving as an abutment for the end of the axle, which is seated in a recess formed therefor in which it fits comparatively closely, and friction reducing bearings located in the bearing chamber of the hub and interposed between the wheel hub and the axle.

In testimony whereof I affix my signature, in presence of two witnesses.

WALTER B. FLOYD.

Witnesses:
CHARLES W. COX,
HARRY E. WEST.